Oct. 8, 1963  T. J. HUGHEL  3,106,086
STRAIN GAGE DILATOMETER
Filed June 17, 1960

INVENTOR.
Thomas J. Hughel
BY
Paul J. Ethington
ATTORNEY

United States Patent Office 3,106,086
Patented Oct. 8, 1963

3,106,086
STRAIN GAGE DILATOMETER
Thomas J. Hughel, Royal Oak, Mich., assignor to General Motors Corporation, Detroit, Mich., a corporation of Delaware
Filed June 17, 1960, Ser. No. 36,817
5 Claims. (Cl. 73—16)

This invention relates to apparatus for measuring the coefficient of thermal expansion of a specimen.

Thermal expansion may be detected or measured by attaching a strain gage of the resistance wire or foil type to the specimen under test and then measuring the change in the electrical characteristics of the strain gage as the temperature of the specimen is varied. However, there is an error component in a reading taken in this manner due to the changes in the characteristics of the strain gage itself as its temperature is varied. A further error is introduced due to the expansion or contraction of the cement or other means with which the strain gage is mounted on the specimen. Since the means used for mounting the strain gage is dependent upon the type of surface upon which the gage is mounted, and also since the thermal characteristic of the strain gage may be non-linear and vary considerably from average values that may be published by the manufacturer of such strain gages, some means must be provided to compensate for errors resulting from these factors.

It is therefore the principal object of this invention to provide a means for compensating for errors introduced into a measurement of thermal expansion due to temperature effects on elements other than the test specimen. It is a further object of this invention to provide means for eliminating errors introduced into measurement of thermal expansion by strain gages.

In accordance with this invention, a strain gage is mounted on a test specimen of which the coefficient of thermal expansion is desired to be obtained. A similar strain gage is mounted on a reference element which consists of a material having a known coefficient of thermal expansion. Both the test specimen and the reference element are maintained at equal temperatures as the temperature is varied over a given range. Electrical indicating means are provided for detecting the change in resistance in each strain gage as the temperature is varied.

The novel features which are believed to be characteristic of the invention are set forth with particularity in the appended claims. The invention itself may best be understood by reference to the following description, taken in conjunction with the accompanying drawing, in which:

Figure 1:
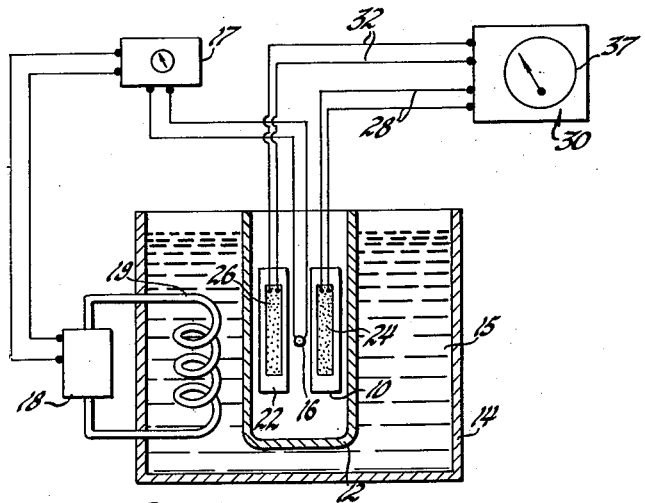
FIGURE 1 is a diagram of testing apparatus incorporating the invention.

Referring now to the drawing, and more particularly to FIGURE 1, there is shown testing apparatus for measuring thermal expansion or for obtaining the coefficient of thermal expansion of a test specimen 10. The specimen 10 is suitably mounted within a tube 12 which may be copper or any heat conducting material. The tube 12 is disposed within a vessel 14 which contains a heat conducting liquid 15. Means are provided for maintaining the liquid 15 at any given temperature within the operating range of the apparatus which may be from −30° C. to +100° C. The temperature of the specimen 10 or the temperature inside the tube 12 is detected by a thermocouple 16 along with a potentiometer on indicating instrument 17. The instrument 17 is adapted to not only indicate the temperature but also to control a heat source 18. The source 18 is connected to heat transfer coils 19 which are submerged in the liquid 15. This arrangement merely serves to maintain the liquid 15 at the desired temperature.

Figure 4:
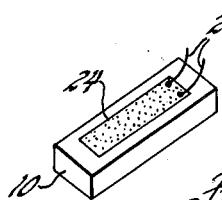
FIGURE 4 is an enlarged view of one of the strain gages mounted on the test specimen.

Also disposed within the tube 12 is a block of reference material 22 such as quartz which has a known coefficient of thermal expansion. A strain gage 24 is mounted on the test specimen 10 by cement or other means as shown in FIGURE 4. Another strain gage 26, selected to have characteristics similar to the gage 24, is mounted on the reference material 22 by the same means. A pair of conductors 28 connect the strain gage 24 to an electrical indicator 30 and in like manner a pair of conductors 32 connect the strain gage 26 to the indicator.

Figure 2:
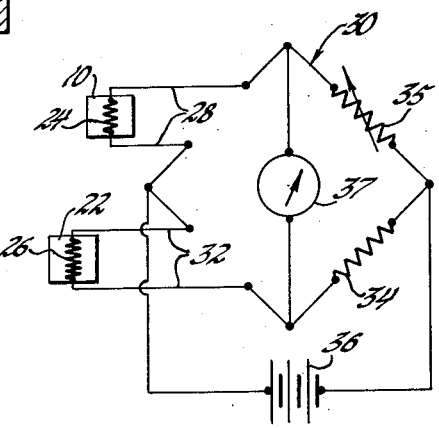
FIGURE 2 is a schematic diagram of the electrical circuit used in the invention.

The indicator 30 includes a circuit which is basically a Wheatstone bridge arrangement as shown in FIGURE 2. Two arms of the bridge include the strain gages 24, 26 which are mounted on the test specimen 10 and the reference material 22, respectively. The two remaining arms include a fixed resistance 34 and a variable resistance 35. A voltage source 36 is connected across the opposite terminals of the bridge and a dilatometer or indicating meter 37 is connected across the remaining terminals. The meter 37 may be calibrated to read expansion in units of length.

Figure 3:
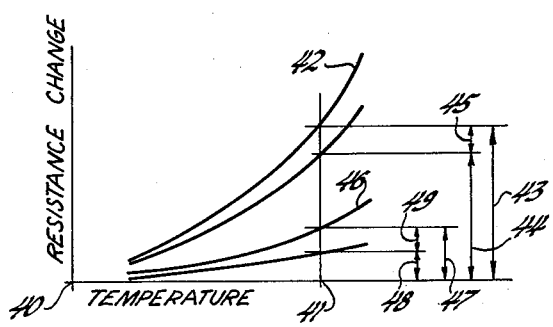
FIGURE 3 is a graphic representation of the change of resistance of the strain gages as a function of temperature.

In the operation of this apparatus a reference temperature 40, as shown in FIGURE 3, is selected and temperature of the liquid 15, the tube 12, the test specimen 10, and the reference material 22 is brought to this temperature by the heat control system which includes the thermocouple 16, the instrument 17, the heat source 18, and the coils 19. After the temperature of the specimen is stabilized, the bridge circuit is then balanced by means of the variable resistor 35 so that the indicator or meter 37 reads zero. The temperature of the liquid, specimen and reference material is then changed by some preselected amount to a temperature 41 by means of the heat control system. As the temperature is increased by a given amount, the test specimen 10 will expand by some unknown amount. The resistance of the strain gage 24 will increase according to the line 42 in FIGURE 3, which is a graph of the change of resistance versus the change of temperature. Thus, as the temperature is increased from the point 40 to the point 41, the resistance of the strain gage 24 will change by a value 43 as shown. This value 43 will include a component 44 due to the expansion of the specimen 10 and also a component 45 caused by the temperature effects on the strain gage itself and the mounting elements used.

The resistance of the strain gage 26 will change with temperature as shown by a line 46 of FIGURE 3. Thus, for a change in temperature 40—41, the resistance of the strain gage 26 as seen by the bridge will change an amount 47 which includes a component 48 due to the known expansion of the reference specimen 42 plus an unknown component 49 due to the temperature effects of the strain gage and mounting elements. The components 45 and 49 should be equal if similar strain gages and mounting techniques are used. Thus, it is seen that if the amount 47 is subtracted from the amount 43, and the component 48 is then added to the remainder, then a value equal to the component 44 will be obtained. This component 44 is proportional to the actual expansion of the test specimen 10 since the unknown temperature effects or the components 45, 49 will be cancelled.

The bridge circuit of FIGURE 2 is effective to provide an indication of the amount 43 minus the amount 47. As the resistance of the strain gage 24 increases, the bridge tends to become unbalanced and a reading is obtained on the meter 37. If the resistance of the strain gage 26 also increases, however, this will decrease the tendency toward unbalance caused by the strain gage 24, and so the deflection of the meter 37 will be decreased by an amount related to the increase of the resistance of the strain gage 26. Thus, if the meter 37 is calibrated to read in units of length and to this reading is added the known expansion of the reference specimen 22 or the component 48, then the true expansion of the test specimen 10 for the given temperature differential will be obtained.

While this invention has been described in terms of a particular embodiment thereof, it will be apparent that modifications may be made by persons skilled in the art. Thus it is contemplated that the appended claims will cover any such modifications as fall within the true scope of the invention.

I claim:

1. Apparatus for measuring thermal expansion of a specimen comprising a first strain gage mounted on said specimen, a reference member composed of a material having a known value of thermal expansion, a second strain gage mounted on said reference member, means for varying the temperature of said specimen and said reference member, and means for measuring the relative impedances of said first and said second strain gages for various values of said temperature, wherein the impedance differences are a function of the thermal expansion of the specimen.

2. Apparatus for measuring thermal expansion of a specimen comprising a first strain gage mounted on said specimen, a reference member composed of a material having a known value of themal expansion, a second strain gage mounted on said reference member, means for varying the temperature of said specimen and said reference member over a given range, and means for detecting the difference between the change in electrical characteristics of said first and second strain gages over said given temperature range, wherein the said difference is a function of the thermal expansion of the specimen.

3. In apparatus for measuring thermal expansion of a specimen, a first strain gage mounted on said specimen, a reference member composed of a material having a known value of thermal expansion, a second strain gage mounted on said reference member, heat control means for maintaining the temperature of said specimen equal to that of said reference member and for varying said temperature over a given range, a bridge circuit having said first strain gage connected in one arm and said second strain gage connected in an adjacent arm, and indicating means responsive to the condition of balance of said bridge, wherein the condition of balance is a measure of the expansion of the specimen compared to the expansion of the reference member.

4. Apparatus for measuring thermal expansion of a specimen comprising first means connected to said specimen for providing an output characteristic related to the length of said specimen, a reference member composed of a material having a known value of thermal expansion, second means connected to said reference member for providing an output characteristic related to the length of said reference member, heat control means for maintaining the temperature of said specimen equal to that of said reference member and for varying said temperature over a given range, and means connected to said first and second means for providing an output which is related to the difference between the output characteristics of said first and second means, said difference being a function of the thermal expansion of the specimen.

5. In apparatus for obtaining a coefficient of thermal expansion of a specimen, a first strain gage mounted on said specimen for providing an output resistance related to the length of said specimen, a reference member composed of a material having a known value of thermal expansion, a second strain gage mounted on said reference member for providing an output resistance related to the length of said reference member, heat control means for maintaining the temperature of said specimen equal to that of said reference member and for varying said temperature over a given range, and indicator means connected to said first and second strain gages for providing an output which is related to the difference between the output resistances thereof, said difference being a function of the coefficient of thermal expansion of the specimen.

References Cited in the file of this patent

UNITED STATES PATENTS

| | | |
|---|---|---|
| 2,513,295 | Eisenberg | July 4, 1950 |
| 2,559,789 | Peckham | July 10, 1951 |
| 2,749,746 | Wright | June 12, 1956 |
| 2,813,958 | MacDonald | Nov. 19, 1957 |
| 2,930,224 | Bodner et al. | Mar. 29, 1960 |